United States Patent
Mathison et al.

(10) Patent No.: US 9,900,404 B2
(45) Date of Patent: Feb. 20, 2018

(54) SMART DEVICE-ASSISTED DIAGNOSIS OF OPERATING STATUSES OF CONSUMER DEVICES

(71) Applicant: Verizon Patent and Licensing Inc., Arlington, VA (US)

(72) Inventors: James Mathison, Warren, NJ (US); Peter Li, West Orange, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/148,898

(22) Filed: May 6, 2016

(65) Prior Publication Data

US 2017/0324840 A1    Nov. 9, 2017

(51) Int. Cl.
| | | |
|---|---|---|
| *G08B 3/00* | (2006.01) | |
| *H04L 29/08* | (2006.01) | |
| *H04L 12/24* | (2006.01) | |
| *H04M 1/725* | (2006.01) | |
| *H04L 12/26* | (2006.01) | |
| *G08B 23/00* | (2006.01) | |

(52) U.S. Cl.
CPC .............. *H04L 67/36* (2013.01); *G08B 23/00* (2013.01); *H04L 41/0686* (2013.01); *H04L 43/14* (2013.01); *H04M 1/72555* (2013.01)

(58) Field of Classification Search
None
See application file for complete search history.

(56) References Cited

U.S. PATENT DOCUMENTS

| | | | | |
|---|---|---|---|---|
| 5,805,813 | A * | 9/1998 | Schweitzer, III | H04N 7/18 348/142 |
| 8,013,730 | B2 * | 9/2011 | Oh | G08B 25/006 340/3.1 |
| 8,494,218 | B2 * | 7/2013 | Chen | G06K 9/2027 348/113 |
| 8,970,349 | B2 * | 3/2015 | Gutierrez | G08B 13/19682 340/506 |
| 2010/0149402 | A1 * | 6/2010 | Aoki | H04N 5/23293 348/333.12 |
| 2013/0282231 | A1 * | 10/2013 | Farr | G06F 7/00 701/34.4 |
| 2015/0109136 | A1 * | 4/2015 | Capozella | G05B 23/0216 340/815.4 |
| 2015/0348385 | A1 * | 12/2015 | Lamb | G08B 29/20 340/547 |

* cited by examiner

*Primary Examiner* — George Bugg
*Assistant Examiner* — Renee Dorsey (57) ABSTRACT

The operational status of devices (such as routers, gateways, etc.) may be determined automatically, without the need for a user to look up status lights or sounds in a manual. A particular device may be automatically identified (e.g., by image recognition techniques), and the operational status may also be automatically identified. For example, a user device may capture an image, video, and/or audio of the device, and may automatically identify an operational status of the device based on the captured image, video, and/or audio. A message and/or suggested set of actions may also be presented to the user, which may indicate the operational status and instructions for one actions that the user may perform to improve the operational status of the device.

20 Claims, 8 Drawing Sheets

SMART DEVICE-ASSISTED DIAGNOSIS OF OPERATING STATUSES OF CONSUMER DEVICES

BACKGROUND

Consumer devices, such as routers, gateways, smart appliances (e.g., smart washer/dryers, smart thermostats, etc.), or the like, may have various states of operation. For instance, such consumer devices may be in an "operating normally" state, a "starting up" state, or in a state that indicates one or more error conditions. Traditional consumer devices may include display lights and/or play audible beeps in order to indicate the operating state. These traditional techniques for indicating a consumer device's operating state may be potentially burdensome, unclear, or otherwise unhelpful for a user who is trying to determine the operating state.

DETAILED DESCRIPTION OF PREFERRED EMBODIMENTS

The following detailed description refers to the accompanying drawings. The same reference numbers in different drawings may identify the same or similar elements.

Status indicators, such as status lights, beeping noises, or the like, may be useful to users who are familiar with the status indicators. Such users may readily ascertain whether a device is operational, is in standby mode, is malfunctioning, and/or is in some other operational status. However, many users often are not familiar with all of the possible combinations of lights and/or sounds, and may experience frustration or confusion when attempting to identify the operating state of a consumer device.

As used herein, a "consumer device" is a device that has the functionality to indicate its operational status through lights and/or other visual indicators, and/or through audible indicators. Additionally, a "user device," as referred to herein, is a device that may be used, in accordance with some implementations, in the diagnosis of an operational status of a consumer device. In some implementations, the same devices may be considered "consumer devices" in some situations, while being considered "user devices" in other situations. For instance, one smartphone may be used to diagnose the operational status of another smartphone, in accordance with some implementations. Thus, the terms "consumer device" and "user device" are used, herein, for the purpose of explaining the role of different devices in the techniques described herein, and are not intended to necessarily imply structural differences.

Figure 1:
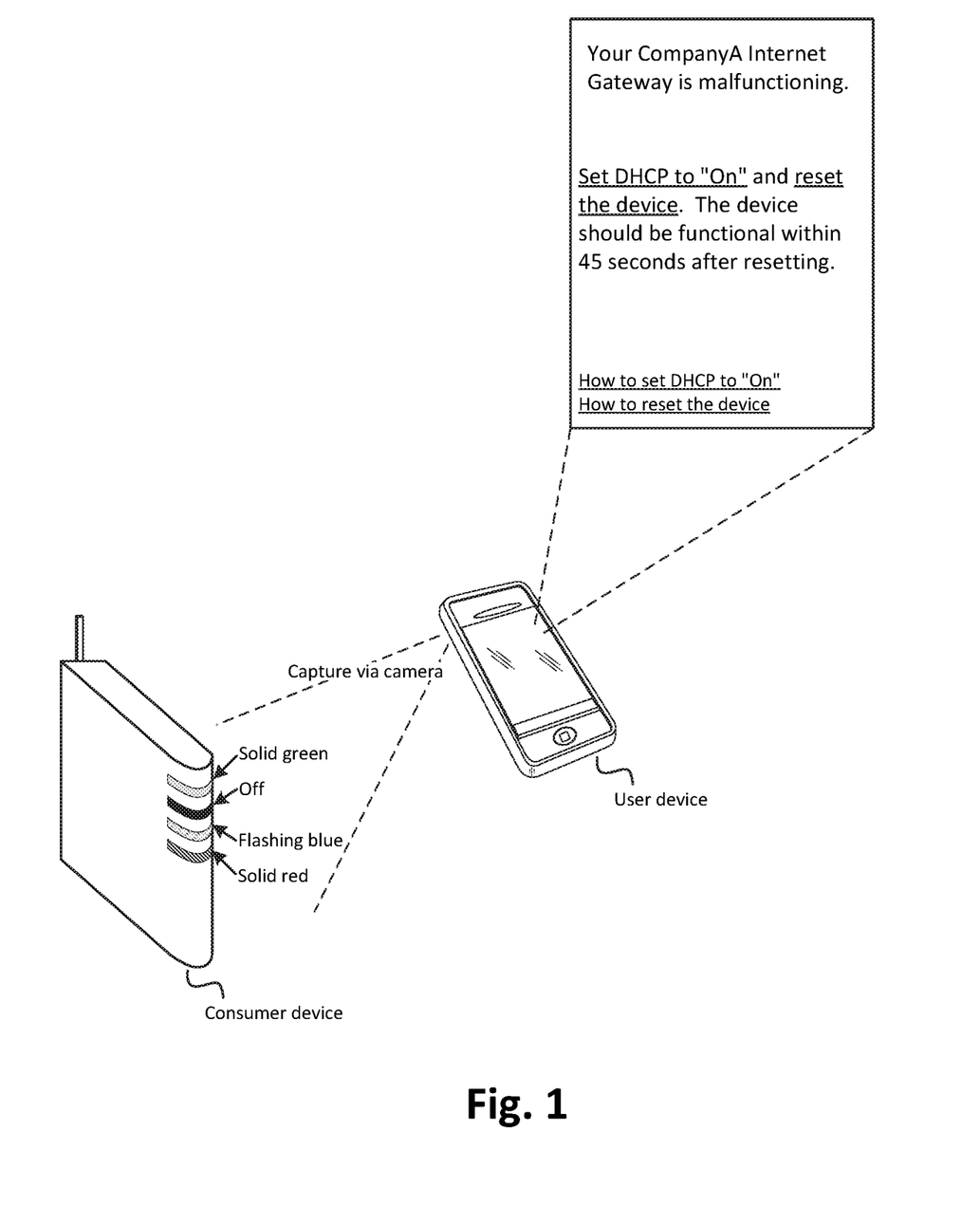
FIG. 1 illustrates an example overview of one or more implementations described herein, in which a user device may intelligently identify an error state associated with a consumer device.

FIG. 1 illustrates an example overview of implementations described herein. For instance, a consumer device (e.g., an Internet gateway, a router, a modem, a network extender, and/or some other device) may include a set of status lights. The status lights may be designed to provide an indication as to the operating status of the consumer device. As shown in the figure, the top-most light may display solid (or "steady") green, the next light may be off, the next light may be flashing (or "blinking") blue, and the bottom-most light may display solid red. This combination of lights may have a specific meaning (i.e., may denote a particular operational status), but a user may not intuitively be able to know what the meaning of the combination of lights is, without locating a manual and then looking up the specific combination in the manual. This process may be time-consuming, and may even be impossible if the user is not able to locate the manual.

In accordance with some implementations, a user device may capture an image or video of the consumer device, identify the operational status, and visually present information regarding the operating status. For instance, as shown, the user device may have identified, based on the combination of lights, that the consumer device is malfunctioning, and may have also identified actions to remedy the malfunction. As further shown, the user device may provide options for instructions on how to perform the identified actions. For instance, hyperlinks may be provided for each action (i.e., How to set DHCP to "On" and How to reset the device), which a user may select in order to obtain instructions on how to perform a given action. As described herein, the user device may identify the make and/or model of the consumer device using image recognition techniques, in order to eliminate the need for the user to manually enter the make and/or model information, thus further streamlining the process for the user.

Figure 2:
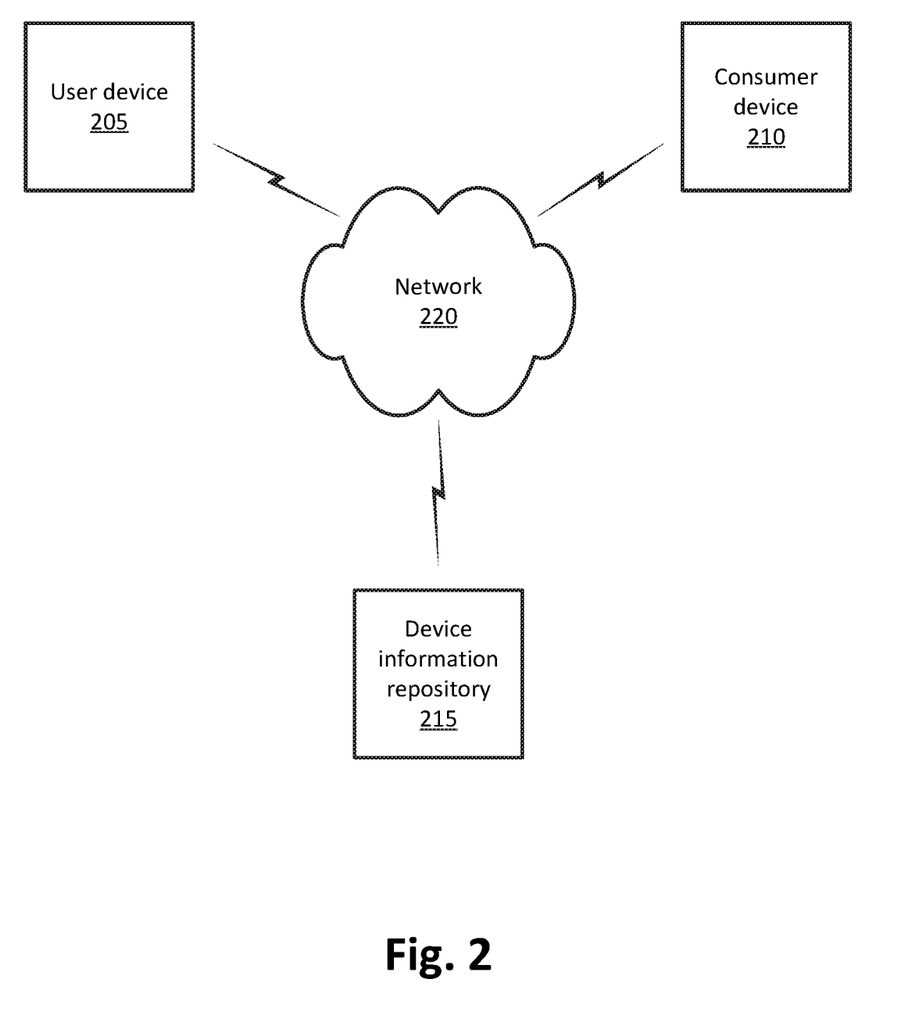
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include user device 205, consumer device 210, device information repository 215, and network 220.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

Also, while "direct" connections are shown in FIG. 2 between various devices and network 220, these devices may communicate with each and/or with network 220 via one or more other devices that are not pictured, such as hubs, routers, switches, gateways, or the like.

User device 205 may include any computation and communication device. User device 205 may be capable of communicating with one or more networks (e.g., network 220). For example, Device 205 may include, and/or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device (e.g., a "smart" watch, "smart" glasses, etc.), and/or another type of computation and communication device. User device 205 may include one or more image and/or video capture devices (such as one or more cameras), and/or one or more audio capture devices (such as one or more microphones).

Consumer device 210 may also include any computation and communication device. As mentioned above, consumer device 210 may, in some implementations, be structurally similar or identical to user device 205. In other implementations, consumer device 210 may be some other type of device. Consumer device 210 may include one or more status indicators, such as a set of status indicator lights, a liquid crystal display ("LCD") screen that displays error codes, and/or an audio output device (e.g., one or more speakers) that output audible status indicators. Consumer device 210 may include, for example, a router, a gateway, a network extender, a smart appliance (e.g., a washer/dryer, a microwave, a thermostat, etc.), or the like.

Device information repository 215 may include one or more server devices (e.g., a single physical device or a distributed set of devices) that store information regarding various consumer devices 210. For instance, as described in further detail below, device information repository 215 may store information that can be used to identify consumer devices 210, such as image data, make and/or model information, and/or other type of information. Device information repository 215 may also store information regarding operational statuses of consumer devices 210 (e.g., combinations of status lights and/or sounds that indicate particular operational statuses). Device information repository 215 may additionally store information regarding instructions for a user to perform certain actions on consumer devices 210 (e.g., how to reset consumer device 210, how to modify settings, etc.).

Network 220 may include one or more radio access networks ("RANs"), via which user device 205 and/or consumer device 210 may access one or more other networks or devices, a core network of a wireless telecommunications network, an IP-based packet data network ("PDN"), a wide area network ("WAN") such as the Internet, a private enterprise network, and/or one or more other networks. In some implementations, network 220 may be, or include, a cellular network, such as a Long-Term Evolution ("LTE") network, a Third Generation ("3G") network, a Code Division Multiple Access ("CDMA") network, etc. User device 205 and/or consumer device 210 may connect, via network 220, to data servers, application servers, other user devices 205 and/or consumer devices 210, etc. Network 220 may be connected to one or more other networks, such as a public switched telephone network ("PSTN"), a public land mobile network ("PLMN"), and/or another network.

Figure 3:
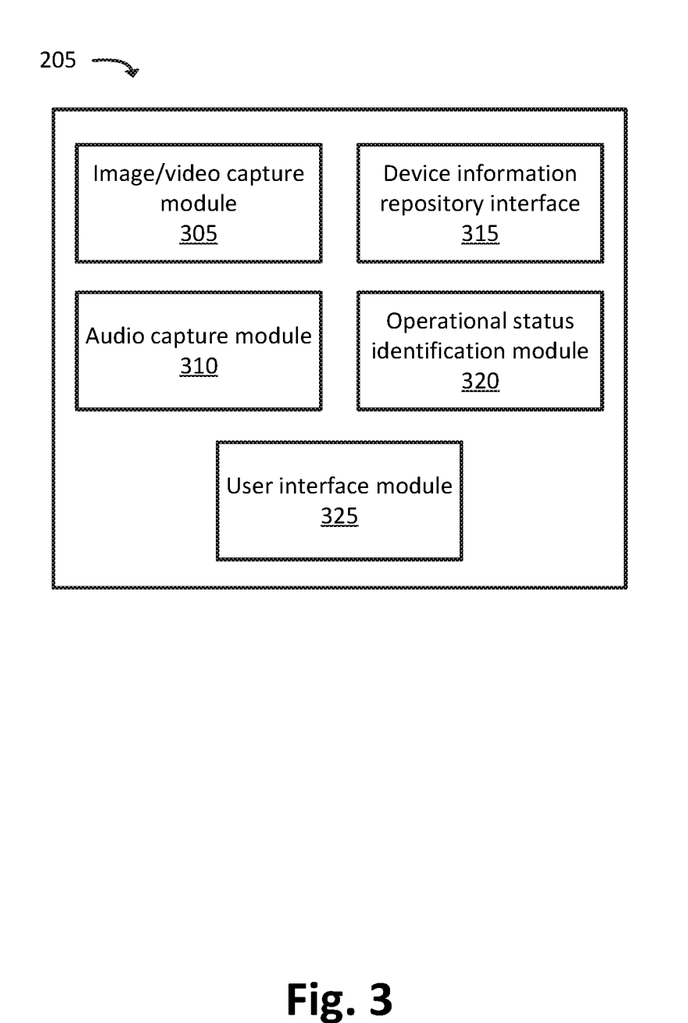
FIG. 3 illustrates example components of a user device, in accordance with some implementations.

FIG. 3 illustrates example components of user device 205, in some implementations. As shown, user device 205 may include image/video capture module 305, audio capture module 310, device information repository interface 315, operational status identification module 320, and user interface module 325. Modules 305-325 may be implemented via hardware circuitry, software logic, or a combination thereof. In some implementations, user device 205 may include additional, fewer, different, and/or differently arranged modules than shown in FIG. 3.

Image/video capture module 305 may capture images (i.e., still images) and/or video. For example, image/video capture module 305 may include, and/or may be communicatively coupled with, an image capture device, such as one or more cameras. Audio capture module 310 may capture audible sounds. For example, audio capture module 310 may include, and/or may be communicatively coupled with, an audio input device, such as one or more microphones. Image/video capture module 305 and audio capture module 310 may generally be used to capture images, video, and/or audio, which may be used to (as described below) identify a particular consumer device 210, and/or to identify an operational of consumer device 210. In some implementations, image/video capture module 305 and/or audio capture module 310 may only capture, or "listen," when a user of user device 205 positively enables the capturing of images, video, and/or audio (e.g., by selecting a graphical option that enables the capture). In some implementations, image/video capture module 305 and/or audio capture module 310 may "passively" capture images, video, and/or audio (e.g., may capture the images, video, and/or audio without a specific request from the user). In either scenario, the user may be afforded the opportunity to entirely disable the capture of images, video, and/or audio, and to completely delete any stored images, video, and/or audio from user device 205 or from any "cloud" storage device.

Device information repository interface 315 may communicate with device information repository 215, in order to obtain information regarding consumer devices 210. For instance, device information repository 215 may store information, via which user device 205 can communicate with device information repository 215 (e.g., an IP address, authentication information, etc.). In some implementations, device information repository interface 315 may store some or all of the information stored by device information repository 215, while in some implementations, device information repository interface 315 may merely be used as a communication interface between user device 205 and device information repository 215.

Figure 4:
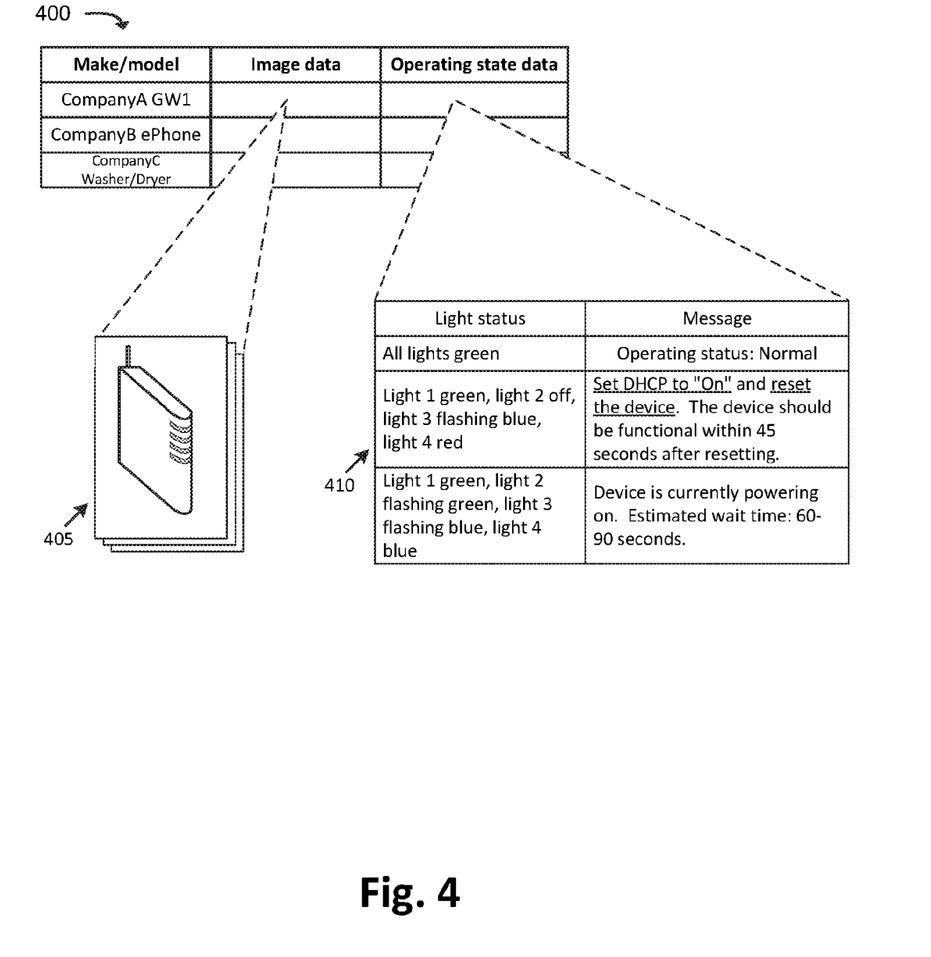
FIG. 4 illustrates an example data structure, in which information regarding consumer devices may be stored.
Figure 5:
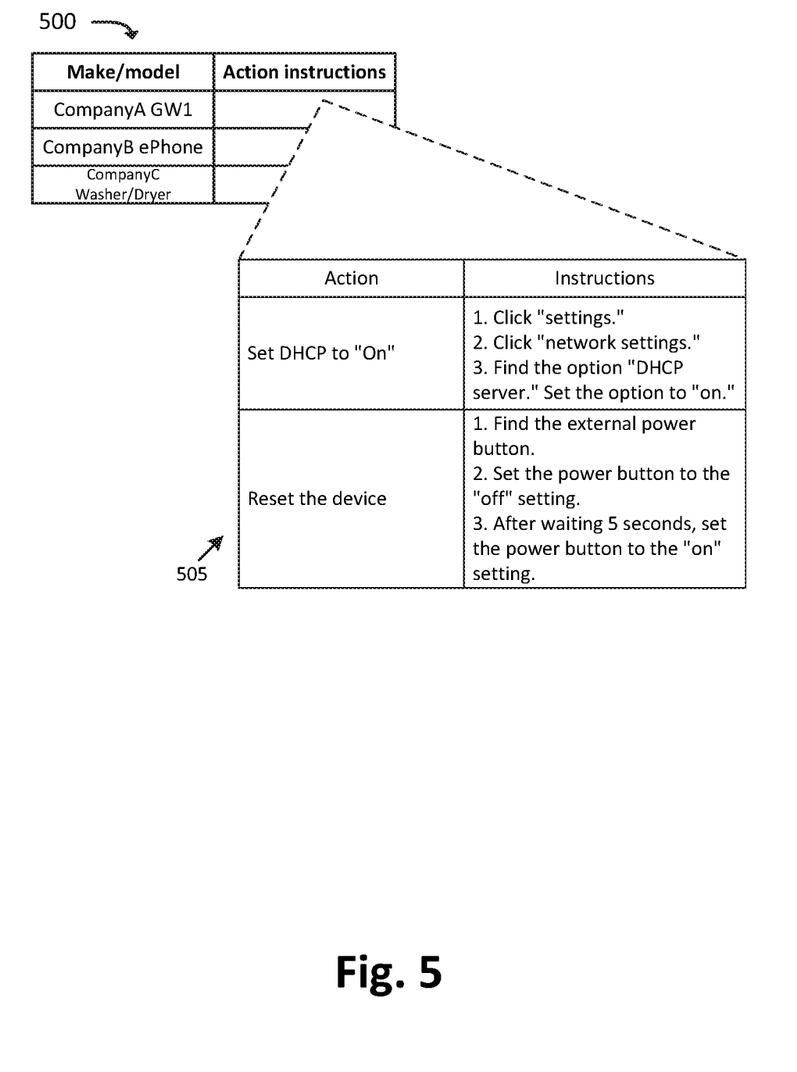
FIG. 5 illustrates an example data structure, in which information regarding actions, that pertain to consumer devices, may be stored.

Examples of information, which may be stored by device information repository 215 (and which may be obtained via, or stored by device information repository interface 315), are shown in FIGS. 4 and 5. For instance, as shown in FIG. 4, data structure 400 may include make and/or model information, image data, and operating state data. The make and/or model field may indicate a manufacturer, a model, and/or some other type of identifying information for a particular consumer device 210.

The image data field may include one or more images 405, which may be helpful in identifying a particular consumer device 210. For instance, the image data may include multiple views of the same particular consumer device 210, such as a front view, a side view, an oblique view, a top view, a back view, etc. The image data may include one or more close-up shots on certain portions of the particular consumer device 210, such as a close-up shot on markings that denote the make and/or model, a close-up shot on physical ports on consumer device 210, a close-up shot on status lights on consumer device 210, etc. The image data field may include pictures of consumer device 210 in different lighting conditions, such as in a brightly light room, a dark room, a sun-lit room, etc. As described below, images 405 (and/or other information) may be used in identifying a given consumer device 210 that is captured by user device 205, using image recognition and/or other techniques. In some implementations, instead of, or in addition to, storing images, the image data field may store other information that may be used to match images of a consumer device. For example, an image matching model (e.g., an artificial neural network, etc.) may be trained on images or descriptive data for each make/model of consumer device, and the image data field may include parameters used to define the model.

The operating state data field may include a data structure (e.g., a nested data structure) that stores information regarding operational statuses and indicators that indicate the operational statuses. For instance, data structure 410 may be an example of the operating state data for a particular consumer device 210 (i.e., the consumer device named the "CompanyA GW1," in this example). Data structure 410 may include indicator status (i.e., "light status," in this example) information. The indicator status information may include information that can be used to identify a particular operational status of consumer device 210, such as the status of one or more status lights (e.g., combinations of status lights, such as different color combinations, solid/blinking combinations, etc.). In short, the indicators status information field may be considered as a set of conditions, where when the set of conditions are met, the operational status of consumer device 210 matches an operational status associated with the set of conditions.

For instance, one particular indicator status information field may include the condition: "all lights green." When the "CompanyA GW1" device displays all green lights, this condition is met. Data structure 410 may also include a message associated with each particular indicator status. For example, as shown, when all lights on the "CompanyA GW1" device are green, the operating status may be "normal." As described below, the associated message (i.e., "Operating status: Normal," in this example) may be provided to user device 205, in order to indicate to a user of user device 205 that the "CompanyA GW1" device is in a "normal" operational status.

As another example, the indicator status information, indicating the set of conditions: "Light 1 green, light 2 off, light 3 flashing blue, light 4 red," may be associated with the message: "Set DHCP to 'On' and reset the device. The device should be functional within 45 seconds after resetting." This particular example message includes two actions to be performed by a user of consumer device 210: "set DHCP to 'On'" and "reset the device." In FIG. 4, these actions are each denoted by an underline. In some implementations, data structure 410 may include metadata, a tag, and/or some other type of code (not shown) to denote that a particular portion of a message is associated with a particular action. For example, the "set DHCP portion to 'On'" portion of the message may be programmatically denoted as an action.

In some implementations, information regarding actions, associated with particular consumer devices 210, may be stored by device information repository 215. For instance, referring to FIG. 5, data structure 500 may store information regarding instructions on how to perform actions for various consumer devices 210. As shown, the action instructions may include a nested data structure for each consumer device 210. For instance, action instructions for the "CompanyA GW1" device may include data structure 505. In this example, the action "set DHCP to 'On'" may be associated with a set of instructions on how to perform the action (i.e., "1. Click 'settings,'" etc.). As described below, the instructions, on how to perform a particular action, may be presented to a user of user device 205 when a particular action is recommended to the user.

While described in the context of a consumer device 210 that includes status lights to indicate its operational status, in some implementations, FIGS. 4 and/or 5 may store information regarding other types of status indicators, such as audio indicators. For instance, data structure 410 may store audio data, such as sound files, that are associated with audible status indicators. The audible status indicators (and, thus, the stored audio data), may include beeps, chirps, and/or other types of noises that may be used to indicate the operational status of consumer device 210. In some implementations, other types of visual indicators may be used in addition to, or in lieu of, status lights. For instance, one type of visual indicator that may be used is an LCD screen that displays an alphanumeric code (e.g., one or more letters, one or more numbers, or a combination thereof). In some implementations, multiple types of status indicators may be used by a particular consumer device 210 (e.g., audible and visual status indicators), and the information stored by data structure 400 may accordingly reflect the multiple types.

Returning to FIG. 3, operational status identification module 320 may identify a particular consumer device 210, based on image and/or video data (e.g., as received from image/video capture module 305), and/or based on audio data (e.g., as received from audio capture module 310). For instance, referring to the example shown in FIG. 1, when user device 205 captures an image of a particular consumer device 210 (e.g., the gateway device with four lights, as shown in FIG. 1), user device 205 may communicate with device information repository 215 (e.g., via device information repository interface 315), in order to determine whether the captured image of the particular consumer device 210 matches one or more images of consumer devices 210 for which device information repository 215 stores image data (e.g., as described above with respect to data structure 400). In some implementations, device information repository interface 315 may locally store some or all of the information stored by device information repository 215 (e.g., data structure 400), and operational status identification module 320 may obtain the information from device information repository interface 315 without contacting device information repository 215. In some implementations, user device 205 (e.g., operational status identification module 320), device information repository 215, and/or some other device may perform image recognition techniques (e.g., known image recognition techniques) in order to determine a match between the captured image and one or more stored images of consumer devices 210.

In some implementations, the user of the user device may be queried to obtain information to assist in the matching of the consumer device. For example, the user may be asked to select the type of consumer device (e.g., refrigerator, router, dishwasher, etc.) or provide some other easily obtained information about the consumer device. The obtained information may be used to assist in the determination of the match between the captured image and one or more stored images of consumer devices 210. In some implementations, the obtained information may be selected as information that is likely to be readily knowable by the user, such as text or other information that is on the front of the device. By contrast, other device identification, such as a unique model number of the device, may not need to be entered by the user if the model number is awkward or difficult for the user to obtain (e.g., it is on the back or underside of the consumer device).

Operational status identification module 320 may also identify an operational status and/or a message associated with the captured image, video, and/or audio data. For instance, operational status identification module 320 may communicate with device information repository 215 (e.g., via device information repository interface 315) to obtain a message associated with status lights, audible sounds, and/or other status indicators that have been captured via the image, video, and/or audio data (e.g., as described above with respect to data structure 500). In some implementations, operational status identification module 320 may obtain the message directly from device information repository 215. In some implementations, user device 205 (e.g., operational status identification module 320), device information repository 215, and/or some other device may perform image recognition techniques (e.g., known image recognition techniques) and/or audio recognition techniques (e.g., known audio recognition techniques) in order to determine whether the captured image, video, and/or audio matches a set of conditions associated with a particular operational status message.

If the operational status message includes one or more actions (e.g., if operational status identification module 320 detects metadata, tags, and/or other code that indicates one or more actions in the operational status message), operational status identification module 320 may retrieve (e.g., from device information repository 215 via device information repository interface 315, or from device information repository 215) instructions on how to perform the actions (e.g., as described above with respect to data structure 505).

Once operational status identification module 320 has identified the particular consumer device 210, as well an operational status message (and, potentially, one or more actions associated with the operational status message), user interface module 325 may present the operational status message and/or instructions regarding the one or more actions to a user of user device 205. For instance, user interface module 325 may present the message and/or instructions on a display screen of user device 205, may audibly speak the message and/or instructions (e.g., using known text-to-speech techniques), may output the message and/or instructions to another device (e.g., a wearable device, via a short range wireless connection, such as Bluetooth, Wi-Fi Direct, or the like).

Figure 6:
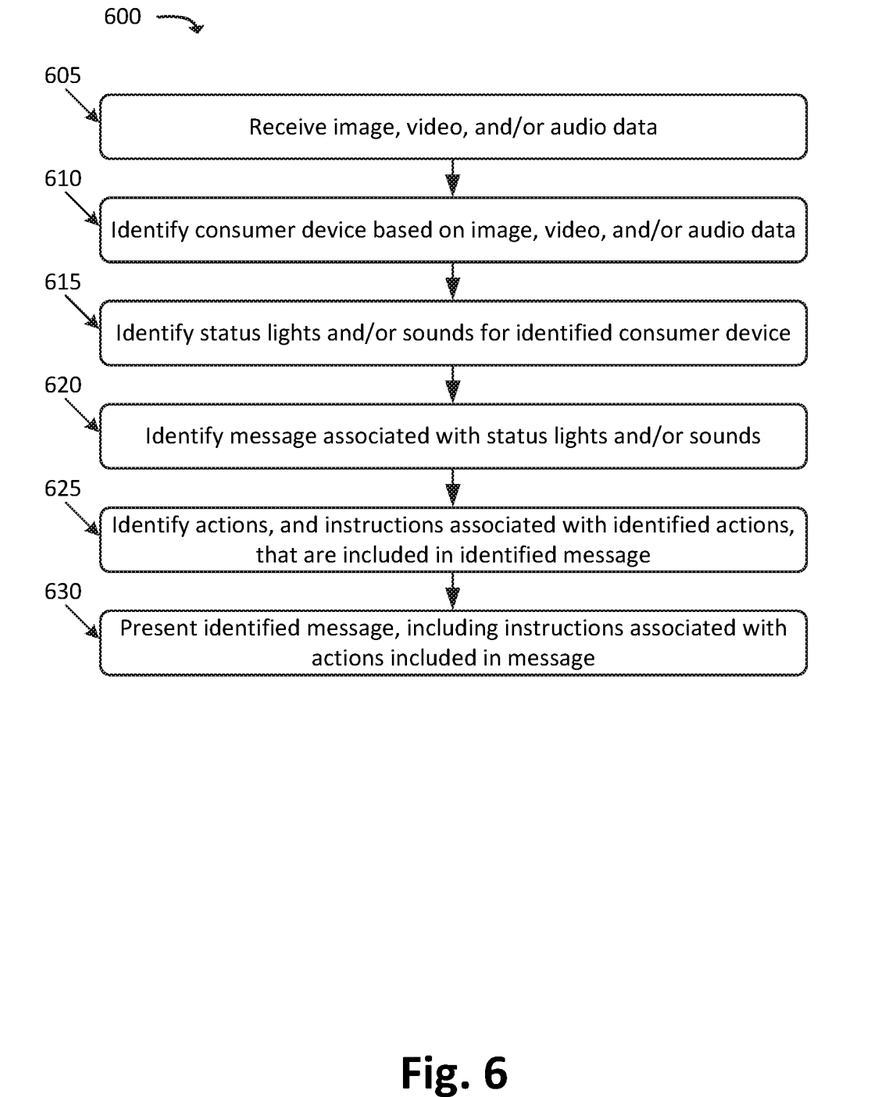
FIG. 6 illustrates an example process for identifying an operational status of a consumer device, and presenting a message regarding the identified operational status.

FIG. 6 illustrates an example process 600 for identifying an operational status of a consumer device, and presenting a message regarding the identified operational status. In some implementations, process 600 may be performed by user device 205, device information repository 215, and/or some other device.

As shown, process 600 may include receiving (at 605) image, video, and/or audio data. For example, as described above with respect to image/video capture module 305 and audio capture module 310, user device 205 may use one or more cameras and/or microphones to capture an image, video, and/or audio. In some implementations, user device 205 may perform the capture based on a specific request from a user (e.g., the user selects an option to record a video, capture a still image, capture audio, etc.). In some implementations, user device 205 may continuously perform the capture (e.g., may capture images on a periodic or intermittent basis, capture video on an ongoing basis, etc.). As mentioned above, the user may have the option to opt out of the use of a microphone and/or camera of user device 205, and may further have the option to delete any captured images, video, or audio.

Process 600 may also include identifying (at 610) a consumer device based on the image, video, and/or audio data. For example, as described above with respect to operational status identification module 320, user device 205 may compare the captured image, video, and/or audio data to information that associates images, video, or audio to particular consumer devices 210. As also described above, such information may be stored by device information repository 215, user device 205, and/or some other device. The identifying may include the performance of image and/or audio recognition techniques.

In some implementations, in addition to, or in lieu of, automatically identifying consumer device 210 based on image, video, and/or audio data (e.g., as described above with respect to blocks 605 and 610), a user may manually specify the make and/or model of consumer device 210. For instance, the user may manually type in the make and/or model of consumer device 210, may select the make and/or model from the drop down list, may provide the make and/or model via voice command, and/or may specify the make and/or model in some other fashion. In some implementations, a group of candidate consumer devices may be identified (at 610), such as in instances where the exact make and/or model of consumer device 210 cannot be identified (e.g., in situations where multiple different consumer devices are similar in appearance). In such situations, the user may be prompted to select the appropriate consumer device 210 from a list that includes the multiple identified candidate consumer devices.

Process 600 may additionally include identifying (at 615) status lights and/or sounds for the identified consumer device. For example, operational status identification module 320 may identify combinations of status lights and/or sounds that are associated with operational statuses of consumer device 210. For instance, as discussed above with respect to data structure 410, the combinations of status lights and/or sounds may be a set of conditions, which, when met, are associated with a particular operating status of consumer device 210.

Process 600 may further include identifying (at 620) a message associated with the status lights and/or sounds, as indicated in the captured image, video, and/or audio. For instance, as also discussed above with respect to data structure 410, operational status identification module 320 may identify a message associated with the current status lights and/or sounds (i.e., the "current" status lights and/or sounds being identified in the captured image, video, and/or audio).

Process 600 may also include identifying (at 625) actions, and instructions associated with the identified actions, that are included in the identified message. For example, as discussed above, operational status identification module 320 may detect actions that are included in the identified message (e.g., by detecting metadata, tags, etc. in the message).

Process 600 may additionally include presenting (at 630) the identified message, including the instructions associated with the actions included in the message. For instance, user interface module 325 may present the message (identified at 620) and/or instructions associated with actions in the message (identified at 625) via a visual interface, via text-to-speech (e.g., audibly), and/or in some other manner.

Figure 7A:
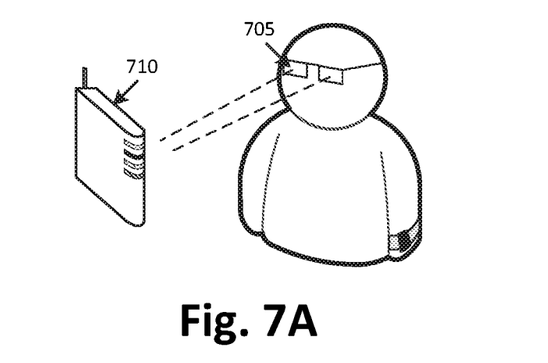
FIGS. 7A-7C illustrate an example implementation, in which one or more wearable devices may be used in the identification of a consumer device and/or the operational status of the consumer device.
Figure 7B:
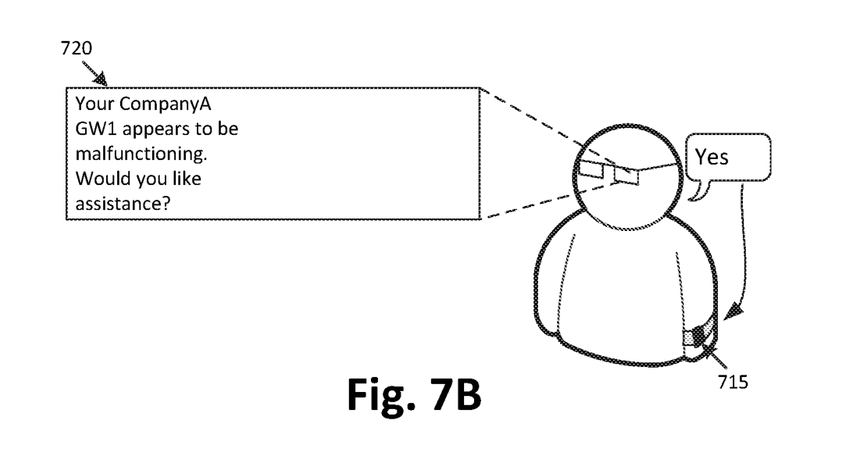
Figure 7C:
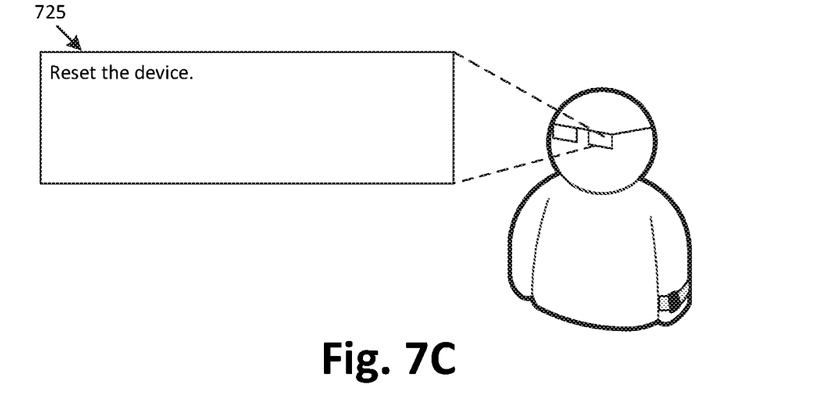

As briefly mentioned above, wearable devices may be used to perform some or all of the techniques described herein. FIGS. 7A-7C illustrate an example implementation, in which one or more wearable devices may be used in the identification of a consumer device and/or the operational status of the consumer device.

As shown in FIG. 7A, a user may be wearing "smart" glasses 705. Smart glasses 705 may include a camera, which is capable of capturing still images and/or video. In some implementations, smart glasses 705 may "continuously" capture images and/or video (with user consent), and may compare captured images and/or video to device information, in order to determine whether the captured images and/or devices include a particular consumer device 210. For example, a user may set smart glasses 705 to begin capturing video when he or she first puts on smart glasses 705 in the morning, and smart glasses 705 may continue to monitor the captured video throughout the day in order to determine whether a particular consumer device 210 has been captured. At some point, as shown in FIG. 7A, smart glasses 705 may determine that consumer device 710 is a consumer device for which operational status information (e.g., as described above with respect to FIGS. 4 and/or 5) is available (e.g., from device information repository 215, locally stored by smart glasses 705, or from some other source).

Smart glasses 705 may further detect, based on the status lights on consumer device 710, that consumer device 710 is in a particular operational status, and that a message regarding the operational status is available. Smart glasses 705 may display (e.g., on a display output portion of smart glasses 705, such as a heads up display ("HUD")-type overlay 720) a message associated with the determined operational status. In some implementations, smart glasses 705 may display a portion of the message, along with a prompt for the user to request additional information. For example, smart glasses 705 may indicate the operational status, and may ask the user if he or she would like information regarding actions that can be taken regarding the operational status.

As further shown in FIG. 7B, the user may verbally speak a response to the prompt. In some implementations, smart glasses 705 may include a microphone or other type of device, via which the user's verbal command can be processed. In some implementations, smart glasses 705 may be communicatively coupled to another device, such as "smart" watch 715, which may include a microphone and/or some other mechanism to process the user's verbal command. Once the user's verbal command is received and processed (i.e., "Yes," in this example), and as shown in FIG. 7C, further messages may be displayed (e.g., via HUD-type overlay 725). The further messages may include one or more actions associated with the operational status of consumer device 710, and/or some other type of message.

In some implementations, the information displayed in these examples (e.g., via overlays 720 and 725) may be pulled directly from the information stored in data structures 400 and/or 500 (e.g., information stored by device information repository 215). In some implementations, the information displayed in these examples may be further processed by smart glasses 705. For example, as discussed above, smart glasses 705 may separate actions from other portions of the messages, and may present them separately (e.g., upon a command from the user).

Figure 8:
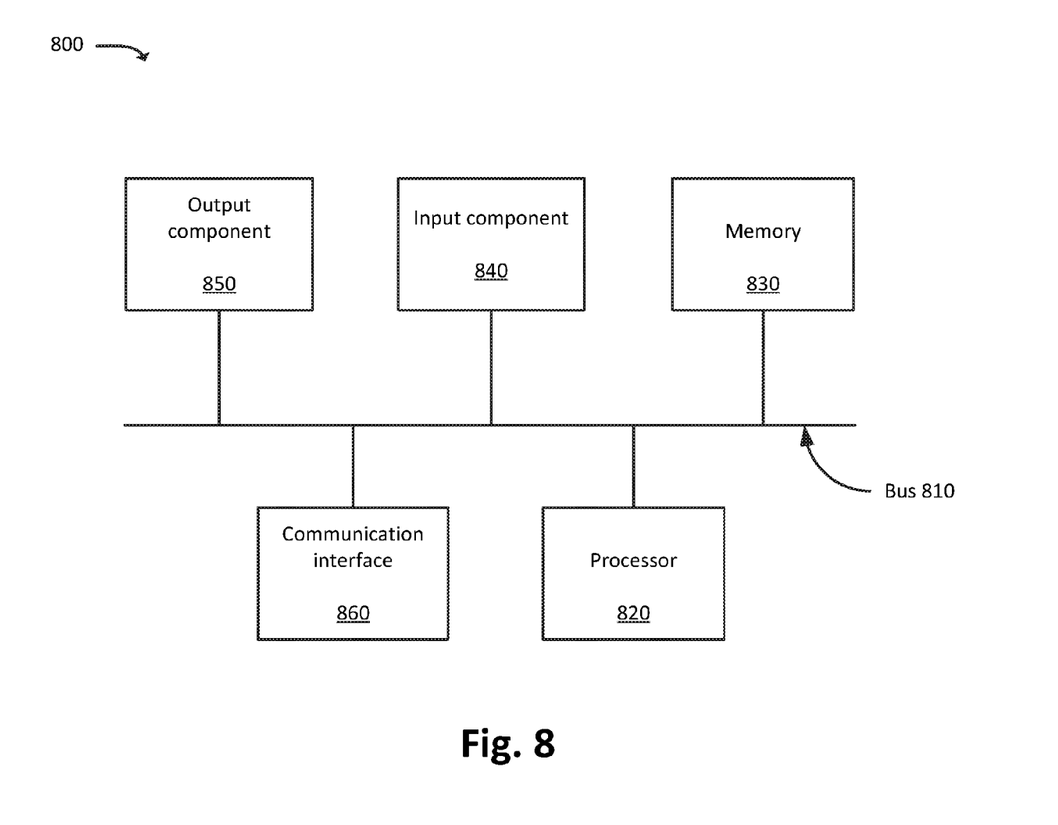
FIG. 8 illustrates example components of a device, in accordance with some implementations described herein.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

As another example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIG. 6, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Furthermore, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the terra "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
   a camera configured to capture images or videos;
   a microphone;
   a memory device storing processor-executable instructions; and
   a processor configured to execute the processor-executable instructions, where executing the processor-executable instructions causes the processor to:
   identify a second device in a particular image or video captured by the camera, the second device including one or more status lights, and the particular image or video including the one or more status lights of the second device;
   capture, using the microphone, one or more audible indicators presented by the second device;
   compare the one or more audible indicators and the captured status lights, of the second device, to information that associates different combinations of audible indicators and colors or blink patterns of status lights, of the second device, to different operational statuses;
   identify, based on the comparing, an operational status of the second device;
   identify a message associated with the identified operational status of the second device; and
   present the message to a user of the first device.

2. The first device of claim 1, wherein the identification of the second device includes performing image recognition on the captured image or video.

3. The first device of claim 2, wherein the performance of the image recognition includes comparing the captured image or video to a set of stored images that are associated with a plurality of devices.

4. The first device of claim 1, wherein the identification the second device is further based on user input that specifies a make or model of the second device.

5. The first device of claim 4, wherein the first device is further configured to:
   determine a set of candidate devices; and
   present information identifying the determined set of candidate devices,
   wherein the user input is a selection of a particular device, in the set of candidate devices.

6. The first device of claim 1, wherein the first device includes a wearable device.

7. The first device of claim 1, wherein executing the processor-executable instructions further causes the processor to:
   request consent, from a user of the first device, to use the camera to capture images or video, and to use the microphone to capture audio,
   begin using the camera to capture images or video, and the microphone to capture audio, only after receiving consent from the user of the first device.

8. A method, performed by a first device, the method comprising:
   capturing, by a camera of the first device, an image or a video;

identifying a second device in the image or video captured by the camera, the second device including one or more status lights, and the image or video including the one or more status lights of the second device;

capturing, using a microphone of the first device, one or more audible indicators presented by the second device;

comparing the captured one or more audible indicators and the captured status lights, of the second device, to information that associates different combinations of audible indicators and colors or blink patterns of status lights, of the second device, to different operational statuses;

identifying, based on the comparing, an operational status of the second device;

identifying a message associated with the identified operational status of the second device; and presenting the message to a user of the first device.

9. The method of claim 8, wherein identifying the second device includes performing image recognition on the captured image or video.

10. The method of claim 9, wherein the performance of the image recognition includes comparing the captured image or video to a set of stored images that are associated with one or more devices, the one or more devices including the second device.

11. The method of claim 8, wherein the first device includes a wearable device.

12. The method claim 8, further comprising:
requesting consent, from a user of the first device, to use the camera to capture images or video, and to use the microphone to capture audio,
beginning to use the camera to capture images or video, and the microphone to capture audio, only after receiving consent from the user of the first device.

13. The method of claim 8, further comprising:
receiving user input that specifies a make or model of the second device, the identification of the second device being further based on the received user input.

14. The method of claim 13, further comprising:
determining a set of candidate devices; and
presenting information identifying the determined set of candidate devices,
wherein the user input is a selection of a particular device, in the set of candidate devices.

15. A non-transitory computer-readable medium, storing a set of processor-executable instructions, which, when executed by a processor of a first device, cause the processor to:
identify a second device in a particular image or video captured by the camera, the second device including one or more status lights, and the particular image or video including the one or more status lights of the second device;
capture, using a microphone of the first device, one or more audible indicators presented by the second device;
compare the captured one or more audible indicators and the status lights, of the second device, to information that associates different combinations of audible indicators and colors or blink patterns of status lights, of the second device, to different operational statuses;
identify, based on the comparing, an operational status of the second device;
identify a message associated with the identified operational status of the second device; and
present the message to a user of the first device.

16. The non-transitory computer-readable medium of claim 15, further comprising instructions that cause the processor to:
perform image recognition on image or video, that is captured via a camera of the first device, in order to identify the second device.

17. The non-transitory computer-readable medium of claim 16, wherein the performance of the image recognition includes a comparison of the captured image or video to a set of stored images that are associated with one or more devices.

18. The non-transitory computer-readable medium of claim 15, wherein the identification the second device is further based on user input that specifies a make or model of the second device.

19. The non-transitory computer-readable medium of claim 18, further comprising instructions that cause the processor to:
determine a set of candidate devices; and
present information identifying the determined set of candidate devices,
wherein the user input is a selection of a particular device, in the set of candidate devices.

20. The non-transitory computer-readable medium of claim 15, further comprising instructions that cause the processor to:
request consent, from a user of the first device, to use the camera to capture images or video, and to use the microphone to capture audio,
begin using the camera to capture images or video, and the microphone to capture audio, only after receiving consent from the user of the first device.

* * * * *